March 26, 1963 J. A. JULIAN 3,082,543
AIR CIRCULATING SYSTEM FOR CHILL CABINETS
Filed July 25, 1960 2 Sheets-Sheet 1

INVENTOR:
JOHN A. JULIAN
BY
ATT'Y

INVENTOR:
JOHN A. JULIAN
ATT'Y

United States Patent Office 3,082,543
Patented Mar. 26, 1963

3,082,543
AIR CIRCULATING SYSTEM FOR
CHILL CABINETS
John A. Julian, 405 Sheridan Road, Kenilworth, Ill.
Filed July 25, 1960, Ser. No. 45,125
1 Claim. (Cl. 34—191)

The present invention relates to the processing of food products and has particular reference to the chilling of meat products such as sausages, hams and the like.

The chilling of meat products is commonly carried out in what is known as a chill cabinet, such cabinet consisting of an enclosure having means associated therewith for introducing and withdrawing the products to be treated. Usually, the sausage or other meat produce is appropriately distributed on a truck, cage, tree or the like which is positioned within the cabinet in the path of cold air issuing from one or more blowers. Such cabinets are devoid of ductwork and the interpositioning of the product in the direct path of cold air issuing from the blower or blowers, together with the gradual reduction of the overall temperature of air within the cabinet, are relied upon to effect the necessary heat removal from and chilling of the product.

In procedures as briefly described above, considerable difficulty, inconvenience, deterioration, and sometimes loss of the product has been experienced due to inequalities and unevenness of the temperature of the cabinet. Due to the fact that the cold air issuing from the blower outlet at a relatively high velocity will, like any free fluid body, follow the path of least resistance and establish a definite flow pattern in and around the product, portions of the product are excessively chilled while other portions thereof are insufficiently chilled. Stated in other words, depending upon the placement of the product in front of the blower and upon the resistance which the product offers to the air issuing from the blower, definite air flow patterns are set up which, for any given loaded truck or cage, are unvarying. Heat exchange between the product and circulating air is, therefore, uneven in different regions of the chill cabinet and those portions of the product which are exposed to the main or high velocity air currents thus become excessively dehydrated, this phenomenon being known as "freezer burn." In the treatment of sausage products, for example, it may be desired to receive the product at a temperature in the neighborhood of 90° F. and to terminate the treatment when the temperature of the product has been reduced to approximately 38° F. At no time is it desired that the temperature of the product, or any portion thereof, be reduced to a point below the freezing temperature. However, since the temperature of air issuing from the blower outlet must necessarily be relatively low, i.e., below the freezing point, if quick and efficient chilling is to be attained, unless the blower air be widely and efficiently distributed throughout the interior of the cabinet and in and around the product, such excessive dehydration of portions of the product will take place, resulting in discoloration, loss of texture and other product impairment.

The present invention is designed to overcome the above-noted limitation that is attendant upon the construction and use of conventional chill cabinets and, toward this end, the invention contemplates the provision of a novel means for effecting a more even distribution of chilling air in, through and around the product within the chill cabinet to the end that freezer burn and the deleterious effects thereof may be eliminated. Accordingly, to provide an apparatus whereby the ultimate temperature which is predetermined for the product may rapidly and efficiently be attained without subjecting the product or any portion thereof to excessive dehydration is, broadly stated, the principal object of the present invention.

It is a further object of the invention to provide an air circulating system for chill cabinets which will attain the above-outlined aims and which may be installed as original equipment or which, alternatively, may be applied to existing chill cabinets without requiring appreciable modification thereof or change in basic design.

Yet another object of the invention is to provide such an air circulating system for chill cabinets which is entirely free from ductwork and which, moreover, is devoid of regulating apparatus such as thermostats, relays and other electrical equipment and which, therefore, is not costly to install, operate and maintain.

These and other objects, which will become more readily apparent as the following description ensues, and which are directed to making the apparatus economical of construction, installation and operation, and durable and dependable, are accomplished by, and the invention embodies in the novel construction, combination and arrangement of parts shown in the accompanying two sheets of drawings forming a part of this specification.

Figure 1:
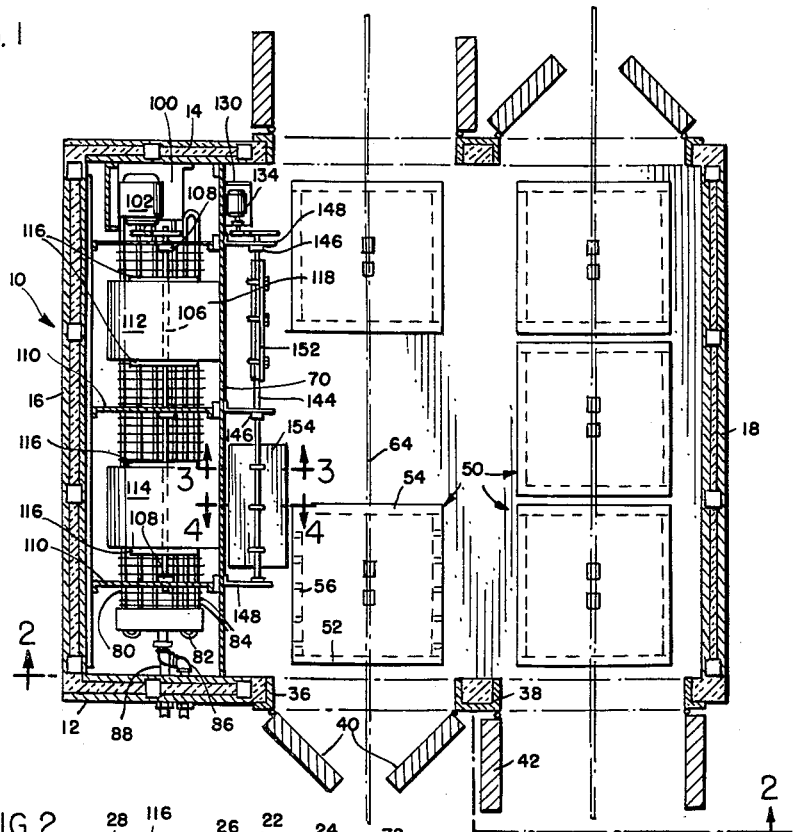
FIG. 1 is a top plan view of a chill cabinet constructed in accordance with the principles of the present invention, with a portion of the top wall of the cabinet broken away and other parts in section to more clearly reveal the nature of the invention.
Figure 2:
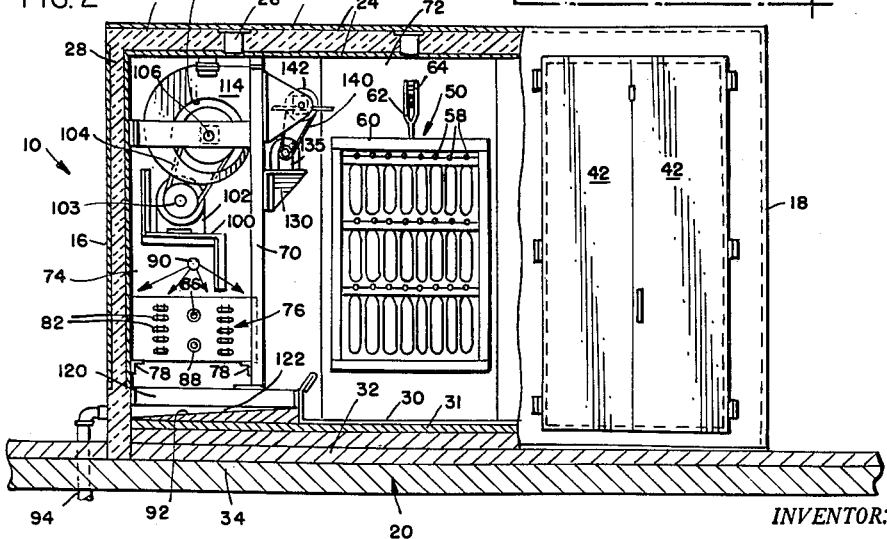
FIG. 2 is a side elevational view of the structure shown in FIG. 1, with a portion of the front wall of the cabinet broken away and certain other parts in section.

Referring now to the drawings in detail and in particular to FIGS. 1 and 2, a chill cabinet has been designated in its entirety at 10 and includes front and rear vertical walls 12 and 14, respectively, vertical side walls 16 and 18, a floor structure 20, and a roof 22. The details of various walls are immaterial insofar as the present invention is concerned, the four walls and roof being shown as being comprised of stainless steel panels 24, carried on structural members 26 and between which suitable insulation 28 is sandwiched. The floor may be in the form of a stainless steel plate 30 set upon a concrete fill 31 carried above insulation 32 which, in turn, is supported on a concrete slab 34. The front wall is provided with a pair of adjacent loading openings 36 and 38, adapted to be closed by conventional sectional hinged swinging doors 40 and 42, respectively. The openings 36 and 38 are provided for the purpose of admitting food products into the interior of the cabinet for treatment, these being transported by means of suitable cages or trucks. In the illustrated embodiment of the cabinet 10, conventional sausage cages 50 are employed, five such cages being shown in FIG. 1.

Each sausage cage 50 is in the form of an inverted U-shaped frame-like structure including front and rear U members 52 and 54, respectively, across which there extend a series of superimposed pairs of spaced notched bars 56. The product has not been illustrated herein, but it will be understood that in the case of a sausage product, the sausages are carried on sticks and these sticks are adapted to be positioned at their ends in the notches 58 in such a manner that the product is evenly distributed throughout the cage 50, all in a manner that is well known in the art. A suspension bar 60 has associated therewith a trolley assembly 62 by means of which the cage as a whole, together with the product thereon, may be supported on an overhead rail 64. The cabinet 10, when fully loaded, is adapted to receive the six cages 50 in the rectangular pattern illustrated in FIG. 1 and in two rows with each row being in alignment with one of the openings 36 or 38, as the case may be.

Still referring to FIGS. 1 and 2, a partition wall 70 divides the interior of the cabinet 10 into a product-containing compartment 72 and a compartment 74 within which a portion of the chilling equipment is enclosed. This chilling equipment may vary basically and, if desired, a self-contained unit of the condenser-compressor-evaporator type may be installed within the compartment 74. For illustrative purposes herein, a conventional heat-transfer unit 76 is shown as being mounted on angle brackets 78 within the compartment 74. The unit 76 is comprised of parallel lengths of tube stock 80 connected at their ends by reverse bends 82 to provide a serpentine structure, the lengths 80 having associated therewith suitable fin stock 84. The unit 76 is adapted to be supplied with a suitable cooling medium, such as brine, through an inlet pipe 86, the coolant being returned to the source through an outlet pipe 88.

A defrosting spray pipe is shown at 90 and the resultant water and condensate is adapted to be collected in a suitable drain pan 92 and discharged through a drain pipe 94.

Positioned above the spray pipe 90 is a shelf-like support 100 for an electric motor 102, the latter having a motor shaft 103 operatively connected by a belt drive 104 to a horizontal blower shaft 106. The blower shaft extends from front to rear through the compartment 74 and is rotatably supported in bearings 108 carried in respective structural supports 110 which extend between the side wall 16 and partition wall 70.

The blower shaft 106 is common to a plurality of blowers, two such blowers being shown at 112 and 114, respectively. These blowers may be in the form of conventional squirrel cage design, each having aligned blower inlets 116 and a blower outlet 118. The two blower outlets 118 communicate with the upper regions of the compartment 72 through the partition wall 70 and they are in horizontal alignment. The lower region of the partition wall 70 is supported upon horizontally extending brace members 120 immediately above the drain pan 92, thus providing a lower air inlet 122 for the compartment 74. The air contained within the cabinet enclosure is adapted to be circulated by passing into the compartment 74 through the inlet 122 and then flow upwardly through the heat exchange unit 76, blowers 112 and 114 and into the compartment 72 through the blower outlets 118.

The arrangement of parts thus far described is purely conventional in its construction and design and no claim is made herein to any novelty associated with the same, the novelty of the present application consisting rather in the means whereby air issuing from the blower outlets 118 is circulated through the compartment 72 and distributed in and around the product which may be contained in the cages 50 and which means will now be described in detail.

Figure 3:
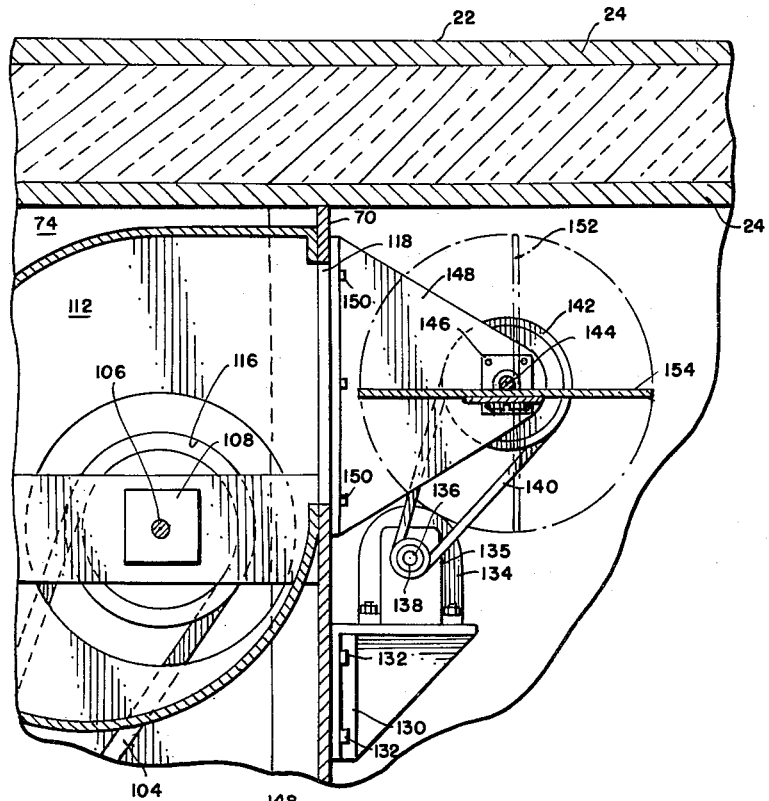
FIG. 3 is an enlarged sectional view taken substantially along the line 3—3 of FIG. 1.

Referring now, additionally, to FIG. 3, a motor-supporting platform bracket 130 is secured by bolts 132 to the partition wall 70 at the rear of the compartment 72 and in the upper regions thereof. An electric motor 134 is positioned on the bracket 130 and is operatively connected to a gear reduction device 135. The output shaft 136 of the gear reduction device 135 carries a pulley 138 which is operatively connected by a belt 140 to a pulley 142 provided on a horizontally extending drive shaft 144. The shaft 144 is rotatably journalled in bearing assemblies 146 mounted on respective supporting brackets 148 secured by bolts 150 to the partition wall and projecting outwardly therefrom into the compartment 72.

Mounted on the shaft 144 and directly in front of each blower discharge opening 118 is a flat rotatable vane-like deflector, the two deflectors being designated at 152 and 154, respectively. Each deflector is in the form of a flat, preferably rectangular sheet of stainless steel and the two deflectors extend at right angles to each other, as best seen in FIG. 1. The width of the deflector is approximately equal to the height of the blower discharge opening which it opposes and the length of the deflector is somewhat greater than the horizontal extent of such opening. The deflector is centered with respect to the opening.

Figure 4:
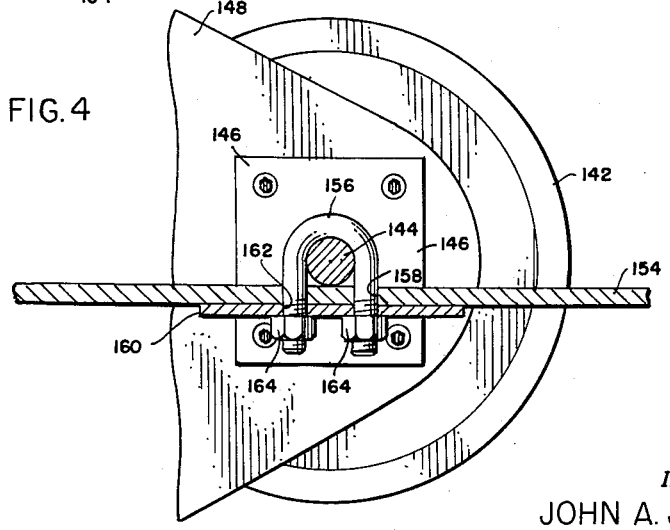
FIG. 4 is an enlarged sectional view taken substantially along the line 4—4 of FIG. 1.

Referring now to FIG. 4, each deflector 152 or 154, as the case may be, is operatively secured to the shaft 144 by means of a series of conventional U-bolts 156 which straddle the shaft and project through openings 158 provided in the deflector on opposite sides of the longitudinal center line of the deflector. Clamping and reinforcing strips or backing plates 160 having holes 162 therein, also receive the U-bolts 156 and are clamped against the deflector by means of clamping nuts 164. By such an arrangement, initial installation of the two deflectors 152 and 154 in their relative angular relationship on the shaft 144 may readily be effected.

It is to be noted that the deflectors 152 and 154 are staggered relative to the sausage cages 50 of the adjacent row of cages so that each deflector spans the distance between two adjacent cages and overlaps both of them. It should also be observed that each deflector, when in its horizontal position, substantially spans the distance between the adjacent blower outlets 118 and the adjacent row of cages 50. Finally, because of the relatively low gear ratio offered by the gear reduction device 135, the speed of rotation of the shaft 144, and consequently of the two deflectors 152 and 154, is relatively slow, preferably on the order of two revolutions per minute.

The deflectors 152 and 154 operate variably to deflect the air issuing from the respective blower outlets 118 so that this air will be prevented from adopting any definite set pattern of flow through the compartment 72 or in and about the product carried by the various cages 50. Because of the fact that the two adjacent deflectors 152 and 154 do not extend in the same direction, but, instead, are set at right angles to each other, the frictional resistance offered by adjacent cross currents of air will further enhance divergence of air flow through the compartment 72. The air issuing from either blower outlet 118 will, upon encountering the adjacent deflector, be guided in continuously changing directions, upwardly toward the roof 22, forwardly toward the product, and downwardly toward the floor 30, depending upon the position of the deflector at any given instant. At no time will the air have an opportunity to select a definite path of flow through the product so that excessive localized dehydration of the product will effectively be prevented.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claim is the same to be limited.

Having thus described the invention what I claim as new and desire to secure by Letters Patent is:

A continuously rotatable air distributor for chill cabinets and adapted during rotation thereof to deflect the streams of air issuing from a series of blower outlet openings arranged in horizontal alignment along one of the cabinet walls, said air distributor comprising a rotary deflector-supporting shaft adapted to be positioned within the cabinet so as to extend horizontally along such wall in front of the openings and in the paths of the air streams issuing therefrom, a plurality of flat vane-like deflectors, one for each opening, mounted on said shaft and spaced longitudinally therealong, each deflector being rectangular in outline and making line contact with the shaft midway between the longitudinal side edges thereof, adjacent deflectors on the shaft lying in planes which extend at a right angle to each other, a U-bolt for securing each deflector in position on the shaft and having a bight portion straddling the shaft and parallel leg portions projecting through the deflector, a backing plate for each U-bolt and positioned flat against the deflector on the side thereof remote from the shaft, said leg portions of the U-bolt passing through the backing plate, clamping nuts threadedly received on the leg portions and serving to clamp the backing plate and deflector bodily as a unit against the shaft, supporting means for the opposite ends of said shaft, and means for continuously rotating said shaft in one direction.

References Cited in the file of this patent

UNITED STATES PATENTS

| | | |
|---|---|---|
| 1,328,398 | Rea et al. | Jan. 20, 1920 |
| 1,947,223 | Ophuls | Feb. 13, 1934 |
| 1,973,022 | Strobell | Sept. 11, 1934 |
| 1,993,062 | Kiesskalt | Mar. 5, 1935 |
| 2,699,106 | Hoyer | Jan. 11, 1955 |
| 2,741,971 | Wheller | Apr. 17, 1956 |
| 2,761,374 | Sandler | Sept. 4, 1956 |
| 2,804,816 | Hoyer | Sept. 3, 1957 |
| 2,923,224 | Stewart | Feb. 2, 1960 |
| 3,004,349 | Bianchi | Oct. 17, 1961 |

FOREIGN PATENTS

| | | |
|---|---|---|
| 1,025,426 | France | Jan. 21, 1953 |